United States Patent [19]
Uber et al.

[11] Patent Number: 5,947,263
[45] Date of Patent: Sep. 7, 1999

[54] CONVEYOR ELEMENT TENSIONING MECHANISM

[75] Inventors: John E. Uber, Trumansburg, N.Y.;
Carl A. Matson, Warren Center, Pa.;
Eugene A. Helmetsie, Spencer, N.Y.

[73] Assignee: Hi-Speed Checkweigher Co., Inc., Ithaca, N.Y.

[21] Appl. No.: 08/920,791

[22] Filed: Aug. 29, 1997

Related U.S. Application Data

[62] Division of application No. 08/591,932, Jan. 29, 1996.

[51] Int. Cl.[6] ................................. B65G 23/44
[52] U.S. Cl. ................................. 198/813; 198/816
[58] Field of Search ............................ 198/813, 816

[56] References Cited

U.S. PATENT DOCUMENTS

| | | | |
|---|---|---|---|
| 2,610,725 | 9/1952 | Schieser et al. | 198/34 |
| 3,638,743 | 2/1972 | Douglas | 177/16 |
| 3,921,793 | 11/1975 | Hutchinson et al. | 198/208 |
| 4,146,126 | 3/1979 | Mattos | 198/862 |
| 4,440,249 | 4/1984 | Del Rosso | 177/145 |
| 4,803,804 | 2/1989 | Bryant | 474/113 |
| 5,174,435 | 12/1992 | Dorner et al. | 198/816 |
| 5,304,745 | 4/1994 | Rusk et al. | 177/50 |

FOREIGN PATENT DOCUMENTS

| | | | |
|---|---|---|---|
| 2604424 | 4/1988 | France | B65G 23/45 |
| 20413 | 1/1992 | Japan | B65G 15/10 |

*Primary Examiner*—William E. Terrell
*Assistant Examiner*—Mark Deuble
*Attorney, Agent, or Firm*—Simpson, Simpson & Snyder

[57] ABSTRACT

A conveyor element tensioning mechanism which is formed by a pair of like tensioning supporting opposite ends of an idler roller. The tensioning devices each include a slide member with a cylindrical pin which is supported within a cylindrical guide opening. The cylindrical pins have a studs extending radially therefrom which extend through a radially opening slots formed along the lengths of the guide openings in order to prevent the cylindrical pins from rotating. The studs support manual operators which may be actuated to move the slide members into a conveyor element tensioning position. During actuation, the manual operators engage an adjustably positioned reference surface so that the resulting tension in the conveyor element may be easily altered.

5 Claims, 9 Drawing Sheets

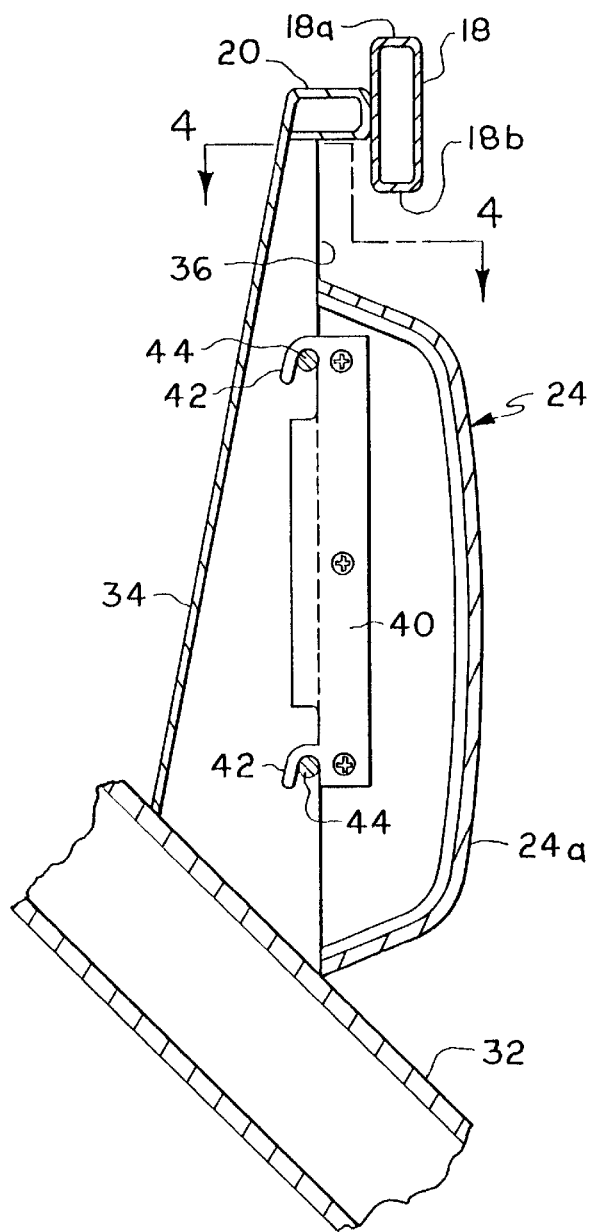
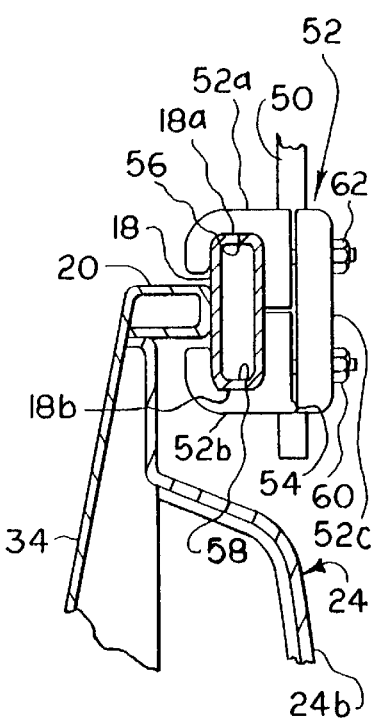
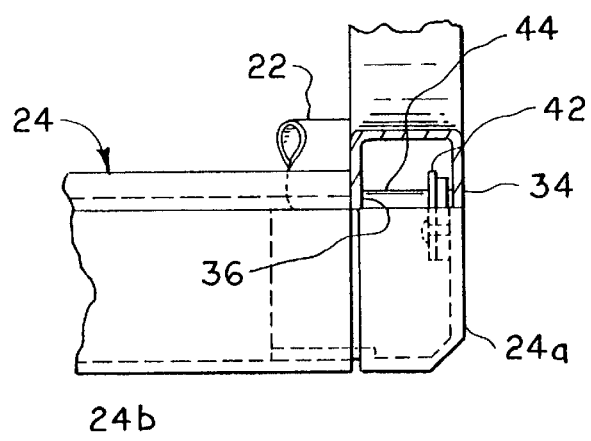
FIG. 2
FIG. 3
FIG. 4

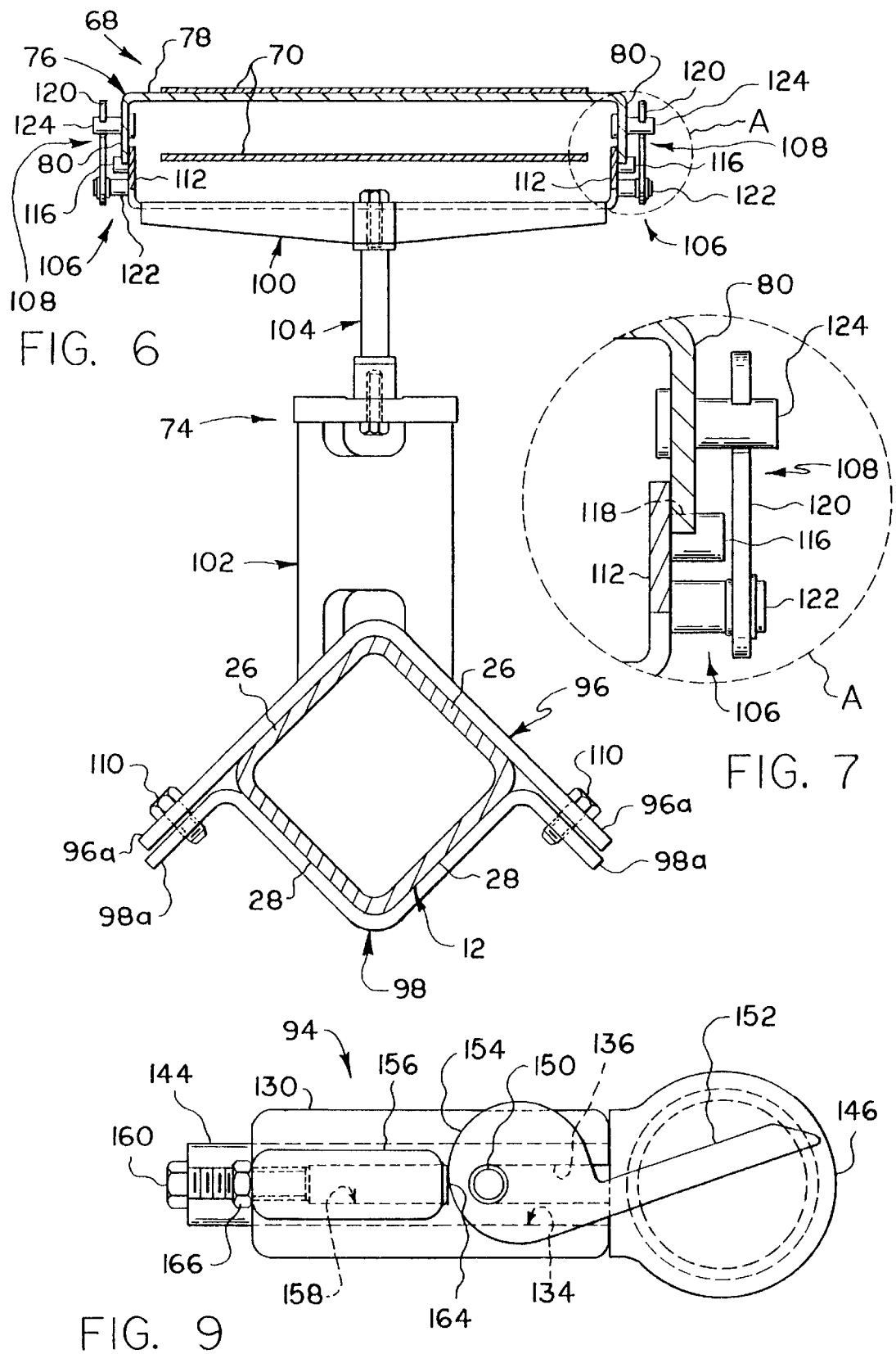

CONVEYOR ELEMENT TENSIONING MECHANISM

This application is a division of application Ser. No. 08/591,932 filed Jan. 29, 1996 which application is now pending.

BACKGROUND OF THE INVENTION

Conveyor mechanisms are typically designed and constructed as unique units with little attempt having been made to use common or standard parts in the manufacture of conveyor mechanisms differing in size and/or function. Thus, prior conveyor mechanisms are oftentimes expensive and time-consuming to manufacture.

SUMMARY OF THE INVENTION

The present invention is directed towards a modular conveyor system employing numerous standard parts allowing their use in the manufacture of multiple conveyor mechanisms with a reduction in overall construction costs and time required to design and manufacture such mechanisms.

The invention contemplates in the first instance, the utilization of an unique supporting framework including a horizontally-elongated spine, a pair of supports depending one from each end of the spine, a pair of standards upstanding one from each support, and at least one elongated rail having it's opposite ends connected to mounting portions defined by the upper ends of the standards.

The spine serves as a common support for modular conveyor units required to be employed in forming a given conveyor mechanism, and the rail serves as a common support for diverse art devices, such as conveyed article detection sensors and improper weight article ejection devices, required to be associated with the modular conveyor units. Thus, the overall length of the conveyor unit supporting framework may be varied as required by a given conveyor mechanism by simply cutting the spine and rails to a desired length and then joining same to suitable supports and standards.

The invention further contemplates a unique arrangement for removably and adjustably mounting the modular conveyor units on the spine, and unique modular units employing diverse types of conveyor elements.

In a first modular conveyor unit suitable for employing a belt-type conveyor element to transport articles across a load cell for weighing purposes, improved arrangements are disclosed for removably supporting the conveyor belt above a load cell and for adjustably controlling the tension of the conveyor belt.

In a second modular conveyor unit suitable for employing a chain-type conveyor to transport articles across a load cell, an improved arrangement is provided to adjustably control positioning of the conveyor chain elements.

BRIEF DESCRIPTION OF THE DRAWINGS

The nature and mode of operation of the present invention will now be more fully described in the following detailed description taken with the accompanying drawings wherein:

FIG. 2 is a sectional view taken generally along the line 2—2 in FIG. 1;

FIG. 3 is a sectional view taken generally along the line 3—3 in FIG. 1;

FIG. 4 is a sectional view taken generally along the line 4—4 in FIG. 2;

FIG. 6 is a side elevational view showing for example one type of modular conveyor adapted for mounting in the framework 6—6 in FIG. 5;

FIG. 7 is an enlarged view of the area designated as A in FIG. 6;

FIG. 9 is a side elevational view of the conveyor belt adjustment mechanism in tension release position;

DETAILED DESCRIPTION

Figure 1:
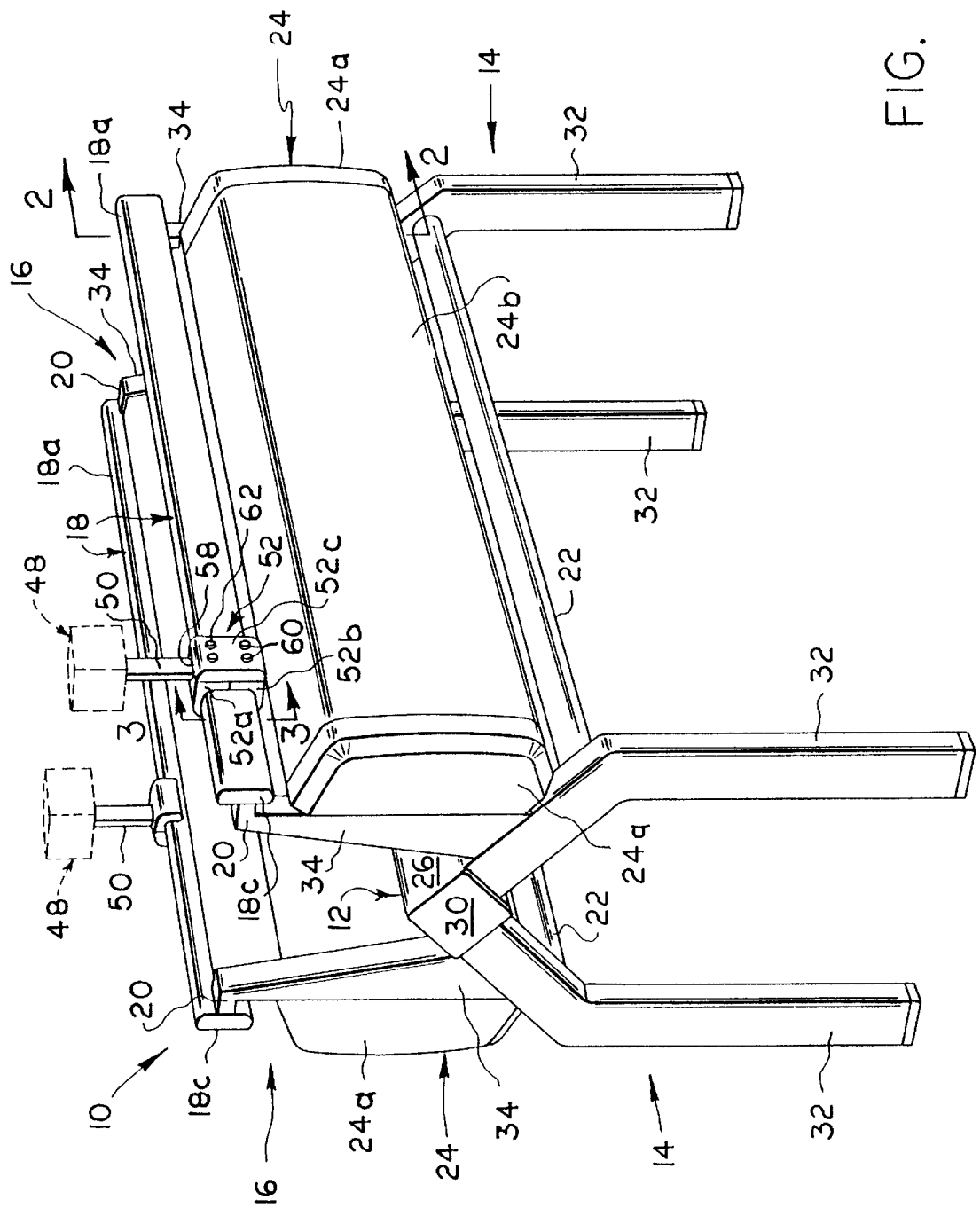
FIG. 1 is a prospective view showing the preferred construction of a supporting framework intended for use in the present modular conveyor system.

Reference is first made to FIGS. 1–4, wherein a supporting framework intended for use in the modular conveyor system of the present invention is generally designated as 10 and shown as including a basic framework construction comprising a horizontally elongated spine 12, a pair of supports 14 and 14 depending one from each end of the spine, a pair of standards 16 and 16 upstanding one from each of the supports, and at least one, and preferably two, elongated rails 18 and 18 mounted adjacent their opposite ends on the standards by mounting portions 20 and 20 such that the rails are disposed above the spine in a parallel, horizontally offset relationship relative thereto. Framework 10 may be completed by a pair of parallel reinforcing or stabilizing tubes 22 and 22 having their ends secured, as by welding, to supports 14 and 14, and a pair of side or cover panels 24 and 24 mounted on standards 16 and 16 in the manner best shown in FIGS. 2–4.

Spine 12 is preferably defined by a hollow, square cross-sectioned tube having a first pair of adjacent side surfaces 26 and 26 arranged to assume an inverted, generally V-shaped configuration, and to define an upwardly facing clamping surface and a second pair of adjacent side surfaces 28 and 28 arranged to assume a generally V-shaped configuration and to define a downwardly facing clamping surface, as best shown in FIG. 6; and a pair of end caps only one of which is shown at 30 in FIG. 1.

Supports 14 and 14 are of like construction and each comprises a pair of legs 32 and 32 having their upper ends secured preferably by welding to second side surfaces 28 and 28 of spine 12 and their lower ends suitably ground supported, such as by adjustable shoes or casters, not shown. Legs 32 and 32 are preferably defined by square tubes and reinforced by cylindrical tubes 22 and 22.

Standards 16 and 16 are of like construction and each comprises a pair of posts 34 and 34 having their lower ends secured preferably by welding one to each of legs 32 and 32. Each of posts 34 is preferably of U-shaped cross-section, thereby to define transversely outwardly facing mounting opening, only one of which is shown at 36 in FIGS. 2 and 4, with each of their upper ends shaped to define one of mounting portions 20, as best shown in FIG. 2. Preferably, mounting portions 20 are fixed to opposite ends of rails 18, as by welding, at a point spaced equidistance from upper and lower lengthwise extending edges 18a and 18b of the rails, as best shown in FIGS. 2 and 3. The ends of rails 18 and 18 may be closed by suitably mounted end caps 18c.

By again referring to FIGS. 2 and 4, it will be noted that side panels 24 and 24 each include a pair of end caps 24a and 24a and a central portion 24b, and that the side panels are mounted on posts 34 and 34 by internally fitting the end caps with mounting plates 40, which define mounting hooks 42 adapted to overlie in engagement with standard mounting means in the form of a pair of mounting rods 44 and 44 arranged to extend horizontally and transversely within each post 34 adjacent it's mounting opening 36. End caps 24a and 24a may be attached to a panel central portion 24b by suitable means, such as by adhesive.

Rails 18 and 18 are preferably formed with a length corresponding to that of spine 12 whose length is in turn determined by the effective length of the modular conveyor units intended to be mounted on framework 10. Rails 18 and 18 are each intended to mount one or more art devices shown for example in broken line at 48, which are required by the type of conveyor unit to be mounted on framework 10. It is contemplated that each art device 48 would be provided with a depending support rod 50, which has it's lower end vertically adjustably mounted by a multiple part clamp assembly 52, which is in turn horizontally adjustably mounted on one of rails 18. In the type of clamp assembly shown in FIGS. 1 and 3, first and second parts 52a and 52b are formed with facing clamping recesses 54 and 56 shaped and sized to loosely slidably engage with upper and lower edges 18a and 18b of rail 18, and a third part 52c cooperates with first part 52a to define a mounting opening 58 for slidably receiving support rod 50. Pivotal or tilting movement of second part 52b relative to first part 52a about a pivot axis defined by a rib 54 for purposes of clamping rail 18 within recesses 56 and 58 is effected by a first adjustment means including a pair of threaded adjustment bolts 60 loosely passing through part 52c and threadably received by second part 52b. Movement of third part 52c relative to first part 52a to effect clamping of support rod 50 within mounting opening 58 is effected by a second adjustment means included a pair of threaded bolts 62 loosely passing through third part 52c and threadably received by first part 52a. A more complete description of the construction and mode of operation of clamp assembly 52 may be had by reference to commonly assigned patent application of Eugene Helmetsie, which is entitled Clamping Mechanism, and filed concurrently herewith.

Reference is now made to FIGS. 5–9, which show a modular conveyor unit 66 formed in accordance with one form of the present invention and intended for mounting on spine 12. Conveyor unit 66 generally includes a frame 68; an endless conveyor element such as a belt 70; drive means 72 for effecting movement of the belt relative to the frame along a path of travel extending lengthwise of the frame and spine 12; and mounting means 74 for adjustably mounting the conveyor unit in a selected position lengthwise of the spine.

Figure 5:
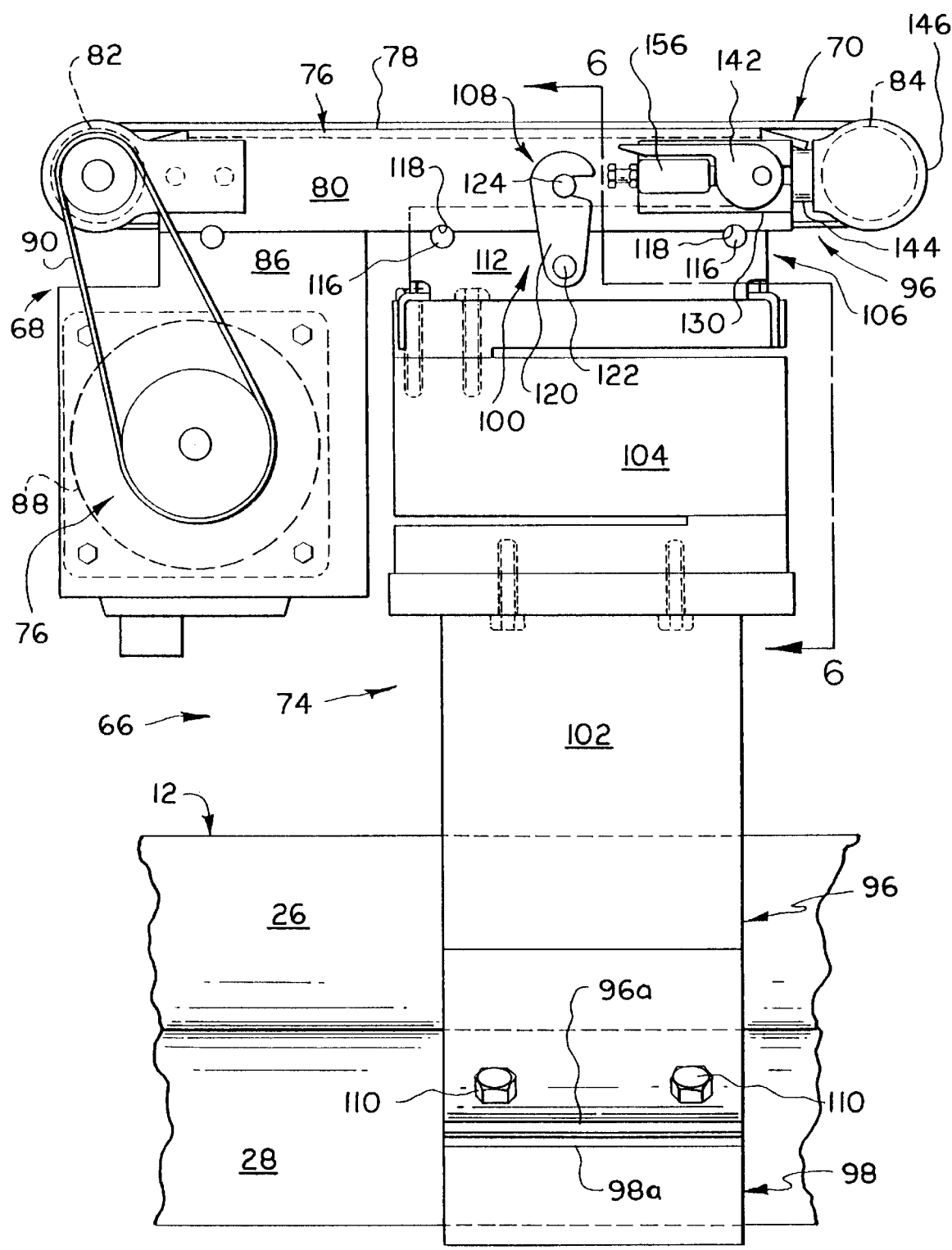
FIG. 5 is a side elevational view showing for example one type of modular conveyor adapted for mounting in the framework of FIG. 1.

Frame 68 is shown in FIGS. 5 and 6 as including an elongated, inverted U-shaped frame member or platform 76 having a horizontally disposed upper panel 78 serving to slidably support an upper flight of belt 70, during passage thereof between infeed and outfeed ends of the frame member, and a pair of parallel, dependant side mounting flanges, 80 and 80. Frame member 76 mounts end guide members shown generally as being in the form of drive and idler rollers 82 and 84, which are arranged adjacent it's infeed and outfeed ends, and a depending bracket 86 serving to mount a conveyor drive motor 88 suitably connected to drive roller 82, as by drive belt 90. Preferably, opposite ends of idler roller 84 are adjustably supported on frame member 76 by a pair of belt tensioning devices 94, which are of mirror image construction and mounted one on each of dependant side mounting flanges 80 and 80. Only one of the tensioning devices is specifically illustrated in FIGS. 5, 8, and 9.

Conveyor unit mounting means 74 is shown in FIGS. 5 and 6 as including first and second spine mounting or clamping brackets 96 and 98, which are arranged to releasably and adjustably clampingly engage with spine 12; a connector bracket 100 coupled to and arranged to overlie first bracket 96 by a standard 102 and a load cell 104; positioning means 106 for releasably supporting frame member 76 on connector bracket 100 in a fixed position relative thereto in a direction extending lengthwise of spine 12; and a latching device 108 for releasably retaining the frame member in it's fixed position.

In FIG. 6, first mounting bracket 96 is shown as having an inverted V-shaped configuration provided with parallel free edge portions 96a and 96a, and second mounting bracket 98 is shown as having an M-shaped configuration provided with parallel free edge portions 98a and 98a. When brackets 96 and 98 are arranged for clamping surface to surface engagement with upwardly and downwardly facing clamping surfaces 26 and 28 of spine 12, as shown in FIG. 6, associated pairs of edge portions 96a and 98a are arranged closely adjacent one another for receipt of clamping means, such as threaded fasteners 110, which are adapted to draw the brackets into clamping engagement with the clamping surfaces. With this mounting arrangement, conveyor unit 66 may be quickly removably mounted on spine 12 in a selectively adjusted position lengthwise thereof.

Connector bracket 100 is shown in FIG. 6 as having a pair of parallel upstanding side flanges 112 arranged for slidably surface engagement to surface with side flanges 80 of frame member 76, whereby to locate the frame member in a direction extending transversely of spine 12. Positioning means 106 preferably includes a pair of parallel pins 116 and 116 which are fixed to each of upstanding flanges 112 to extend horizontally transversely of spine 12; and a pair of edge-opening recesses 118 and 118, which are formed in each of dependant side flanges 80 and sized to removably slidably receive pins 116 upon lowering of frame 76 downwardly onto connector bracket 100. Frame 76 is releasably retained in a fixed position relative to connector bracket 100, as determined by engagement of pins 116 and recesses 118, by a pair of latching devices 108 and 108, which preferably include a pair of latch fingers 120 and 120 pivotally supported on upstanding side flanges 112 and 112 by pivot pins 122 and 122, and a pair of cooperating latch pins 124 and 124 fixed to dependant side flanges 80 and 80. It is contemplated that the parts of positioning means 106 and latch device 108 may be reversed.

Figure 8:
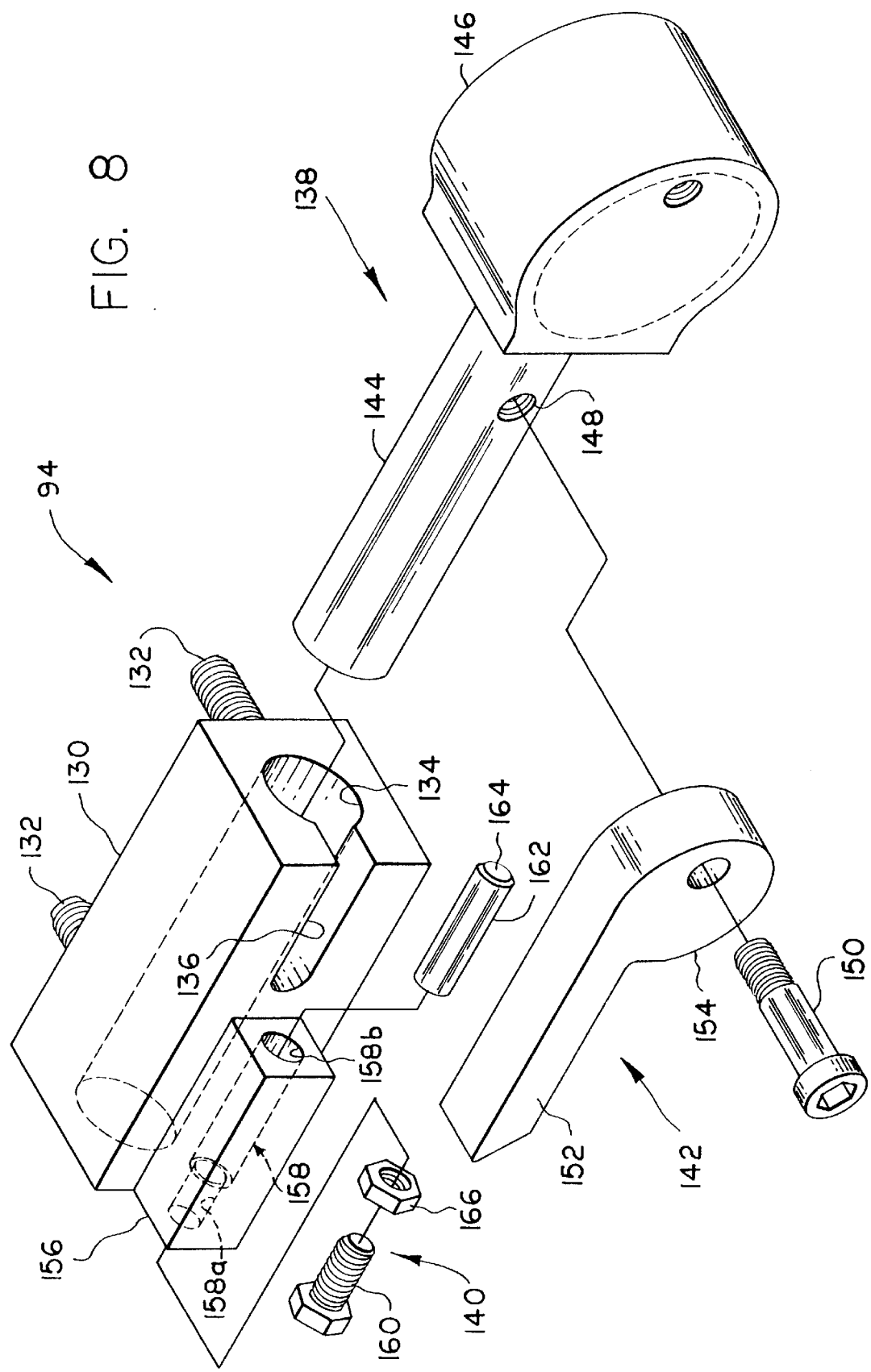
FIG. 8 is an exploded prospective view of a conveyor belt adjustment mechanism.
Figure 10:
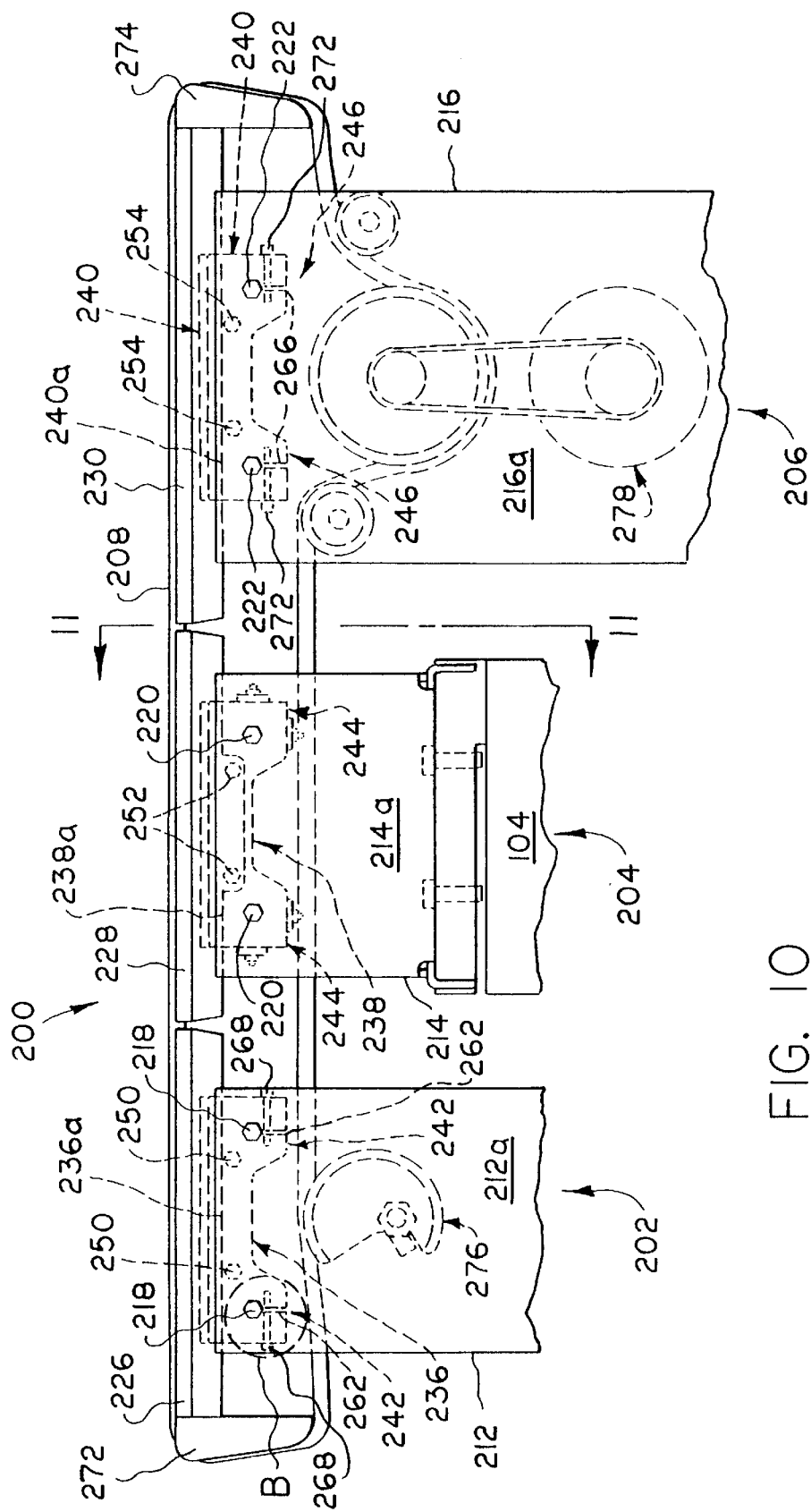
FIG. 10 is a side elevational view showing for example another type of modular conveyor adapted for mounting on the framework of FIG. 1.

A tensioning device 94 formed in accordance with the present invention is best shown in FIG. 8 as including guide means in the form of a guide block 130, which is suitably fixed to an associated one of dependant flanges 80 by a pair of mounting bolts 132 and defines a cylindrical guide or bore opening 134 extending therethrough in a direction aligned with the path of travel of conveyor belt 70 and a slot 136 arranged to open radially and extend lengthwise of opening 134; a slide member 138; a tension adjustment means 140; and an operator 142. Slide number 138 has a first end in the form of a cylindrical pin 144 sized to be removably slidably supported within guide opening 134 and a second end in the form of an enlarged head portion 146 adapted for supporting one end of idler roller 84. Pin 144 is provided with a transversely opening threaded opening 148 for receiving a threaded stud 150 serving to rotatably mount operator 142 for manually induced movement between tension release and tensioning positions shown in FIGS. 9 and 5, respectively, with stud 150 being slidably received within slot 136 to prevent rotation of pin 144 within guide opening 134. Operator 142 is characterized as having a handle portion 152 and a cam surface 154. Adjustment means 140 includes a mounting block 156, which is fixed to guide block 130 and defines an adjustment opening 158 disposed parallel to guide opening 134. Adjustment opening 158 has one end 158a threaded to adjustably receive an adjustment bolt 160 and an opposite cylindrical end 158b for slidably supporting an adjustment pin 162 whose inner end is arranged to be engaged by the adjustment bolt and whose outer end serves to define a reference surface 164 arranged for engagement with operator cam surface 154. A locking or clamping nut 166 may be threaded onto adjustment bolt 160 for engagement with an end surface of mounting block 156 peripherally of first end 158a of opening 158 in order to prevent undesired rotations of such bolt.

Conveyor belt 70 may be mounted on frame 76 and trained about drive roller 82 and 84, while frame 76 is removed from supporting engagement with connector bracket 100 and operator 142 is in it's tension release position of FIG. 9. Thereafter conveyor belt 70 may be tensioned by rotating operator 142 of each tensioning device into it's tensioned position of FIG. 5, as an incident to which cam surface 154 is caused to slidably engage with reference surface 164 and thereby force slide member 138 to move in a direction extending outwardly of guide opening 134 such that the distance between rollers 82 and 84 is increased. The amount of tension imparted to conveyor belt 70 may be adjustably varied by threaded adjustments of adjustment bolt 160 relative to first end 158a of adjustment opening 158. It will be understood that the operators of both tension devices 94 would normally be simultaneously operated for conveyor belt tensioning and release purposes.

The-illustrated construction of tensioning devices 94 is such that their components may be completely disassembled for cleaning purposes.

Reference is now made to FIGS. 10–14 which show a second form of modular conveyor unit generally designed as 200 and adapted for mounting on spine 12 in the same manner as that described with reference to unit 66. In this form of the invention, separately formed infeed, weighing and discharge sections 202, 204 and 206 are individually and adjustably supported on common spine 12 and coupled by two or more common, continuous conveyor chain elements 208 moveable along a path of travel extending lengthwise of the spine.

Figure 11:
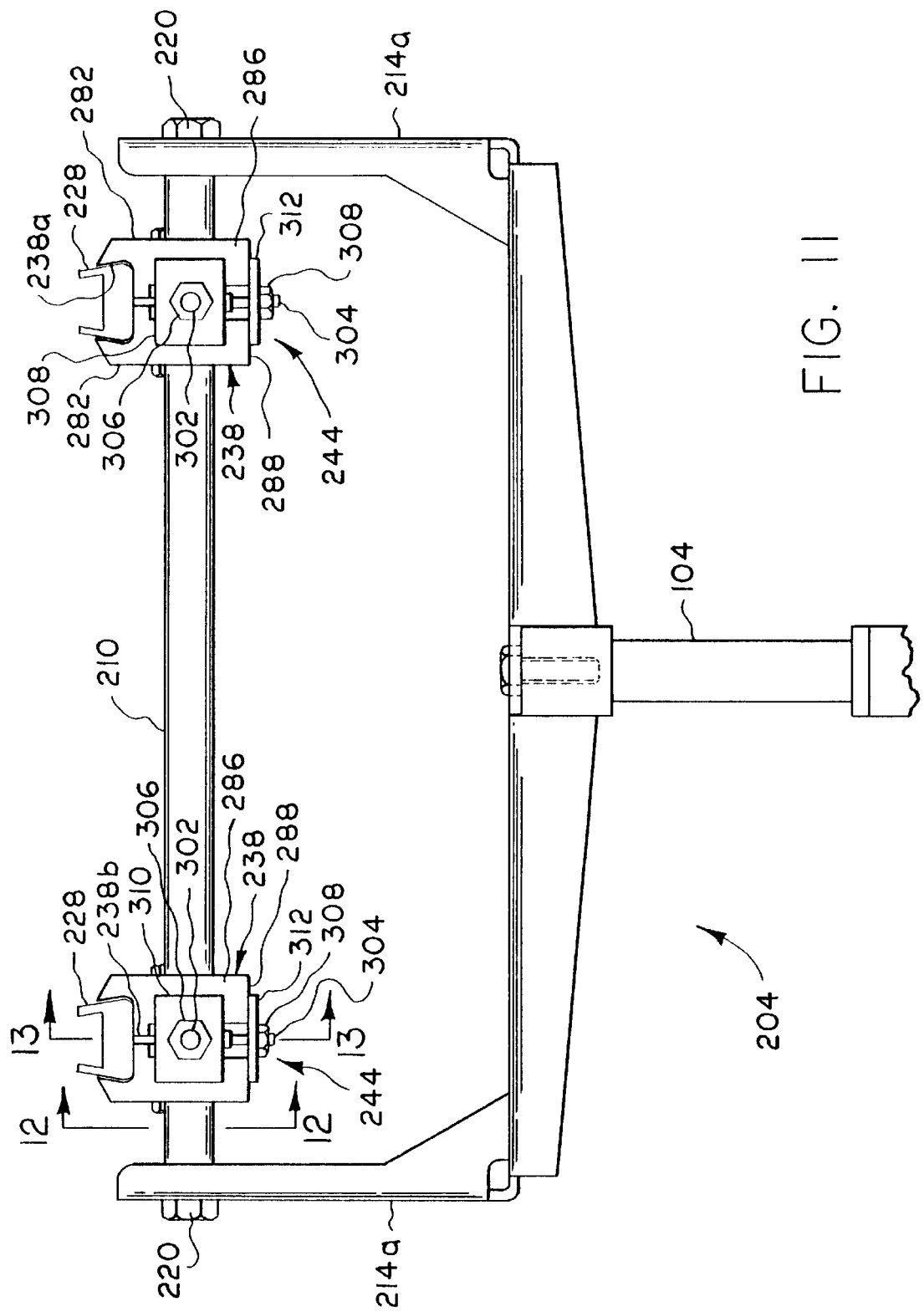
FIG. 11 is a sectional view taken generally along the line 11—11 in FIG. 10.
Figure 12:
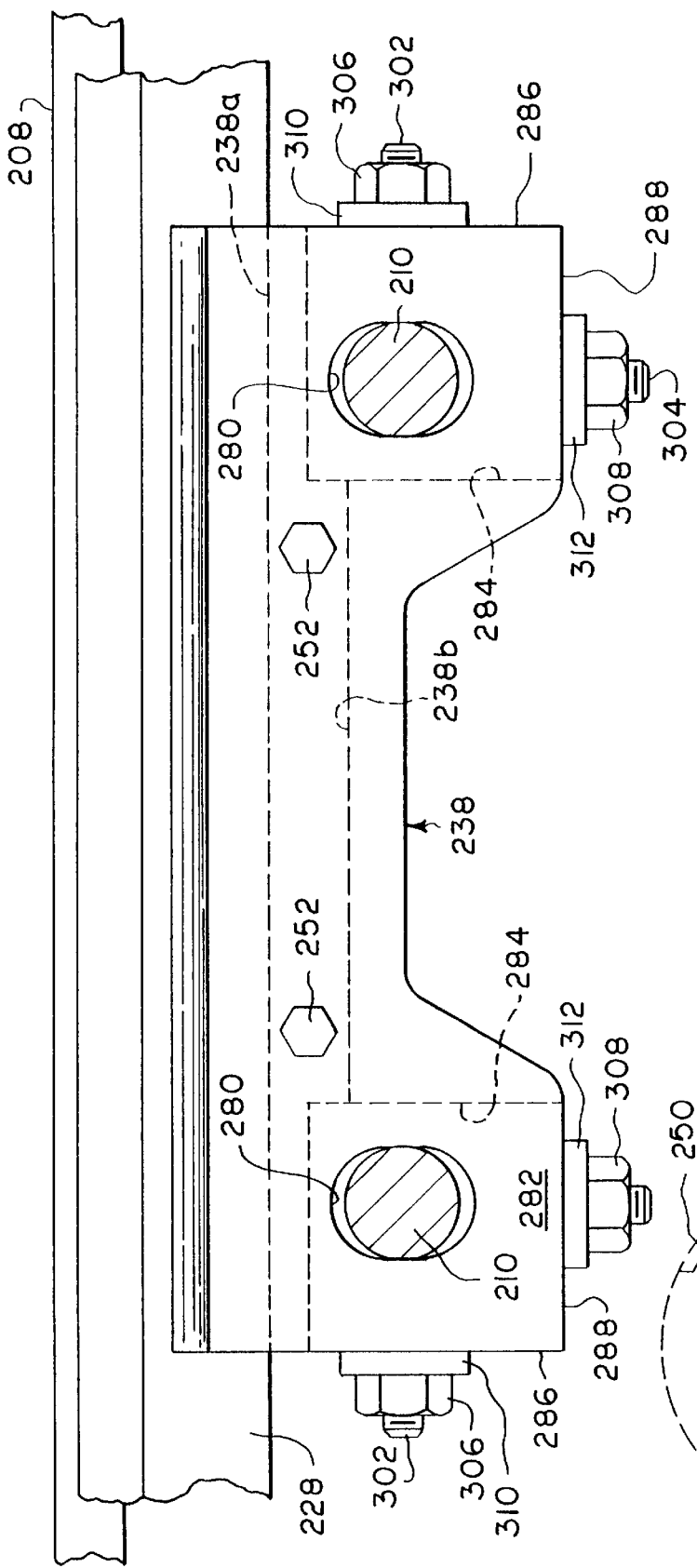
FIG. 12 is a sectional view taken generally along the line 12—12 in FIG. 11.
Figure 15:
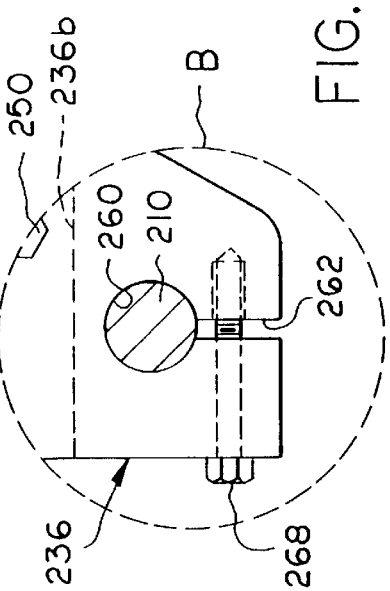
FIG. 15 is an enlarged view of the area designated as B in FIG. 10.

Sections 202, 204 and 206 are of similar construction in that they each include a pair of parallel support elements, which are disposed to extend horizontally and transversely of the path of travel and shown as 210 only for the case of infeed section 202 and weighing section 204 in FIGS. 11, 12 and 15. The pairs of support elements are mounted on connector brackets 212, 214 and 216 by threaded bolts 218, 220 and 222 passing through parallel upstanding flanges 212a, 214a and 216a of the connector brackets for receipt within threaded openings, not shown, which open axially through the ends of the support elements. Connector brackets 212, 214 and 216 are preferably coupled to upstand above three first spine clamping brackets of the type shown at 96 in FIGS. 5 and 6 in order to permit the sections to be individually removably and adjustably fixed to spine 12 in desired locations spaced lengthwise thereof. In the case of weighing station 204, connector bracket 214 would be connected to the top of load cell 104, which would in turn be connected to a standard, not shown, upstanding from a first spine-clamping bracket.

Each of sections 202, 204 and 206 additionally includes chain element support means for mounting each of the chains elements on their associated support elements, which comprise elongated runners 226, 228 and 230 for slidably supporting chain elements passing thereover, elongated runner supports 236, 238 and 240, having lengthwise extending grooves 236a, 238a and 240a for slidably supporting their associated runners, and pairs of adjustable mounting means 242, 244 and 246 provided adjacent each end of the runner supports for adjustably mounting same on the support elements. Runners 226, 228 and 230 are releasably clamped within grooves 236a, 238a and 240a by means of threaded bolts 250, 252 and 254 arranged to extend across slots, which open upwardly into the grooves as shown only for the case of slots 236b and 238b in FIGS. 11–15. Runner supports 236 and 240 are similar in that their adjustable mounting means 242 and 246 include transversely extending bore openings, shown at 260 in FIG. 15 only for the case of runner support 236, which serve to slidably receive their associated support elements. These bore openings communicate with slots 262 and 266, and clamping bolts 268 and 272 extend across these slots to effect clamping of the support elements within the bore openings. With this construction, runner supports 236 and 240, and thus runners 226 and 230, may be adjustably fixed to their associated support elements to vary the distance between the chain elements, and runners 236 and 240 may be adjustably fixed in desired positions lengthwise within grooves 236a and 240a in a direction lengthwise of the path of conveyor travel.

As desired, infeed and outfeed sections 202 and 206 may be completed by providing appropriate chain guides 272 and 274, chain tension control devices 276 and a conveyor drive, including motor 278.

By now referring to FIGS. 11–14, it will be noted that the opposite ends of runner support 238 are formed with generally oval-shaped openings 280 and 280, which open transversely through opposite side surfaces 282 and 282 of the runner support and slidably receive support elements 210, as best shown in FIG. 12. These opposite ends of runner support 238 are also formed with adjustment slots 284 and 284 which communicate with openings 280 and 280, and open outwardly through end surfaces 286 and 286, and lower surfaces 288 and 288.

Figure 14:
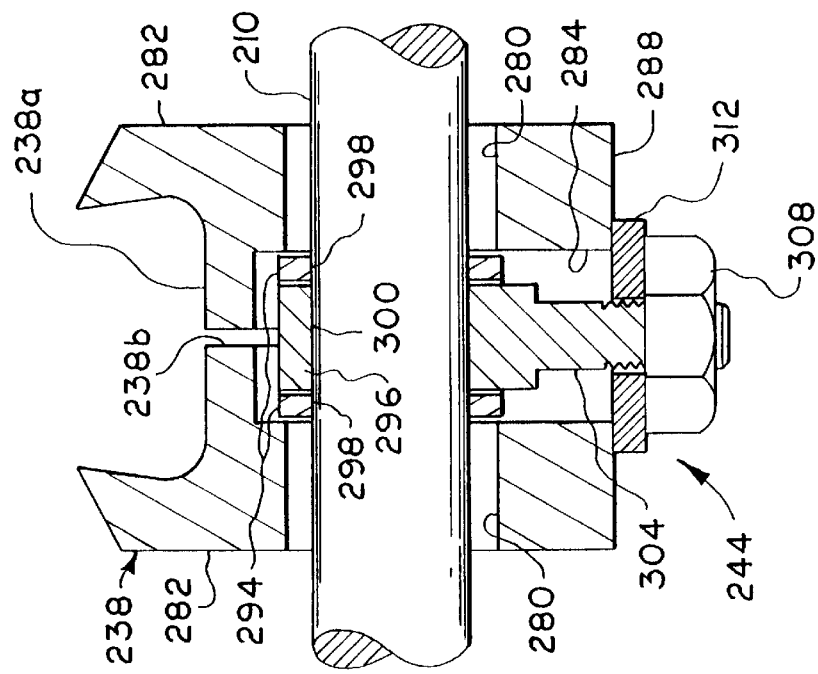
FIG. 14 is a sectional view taken generally along the line 14—14 in FIG. 13.
Figure 13:
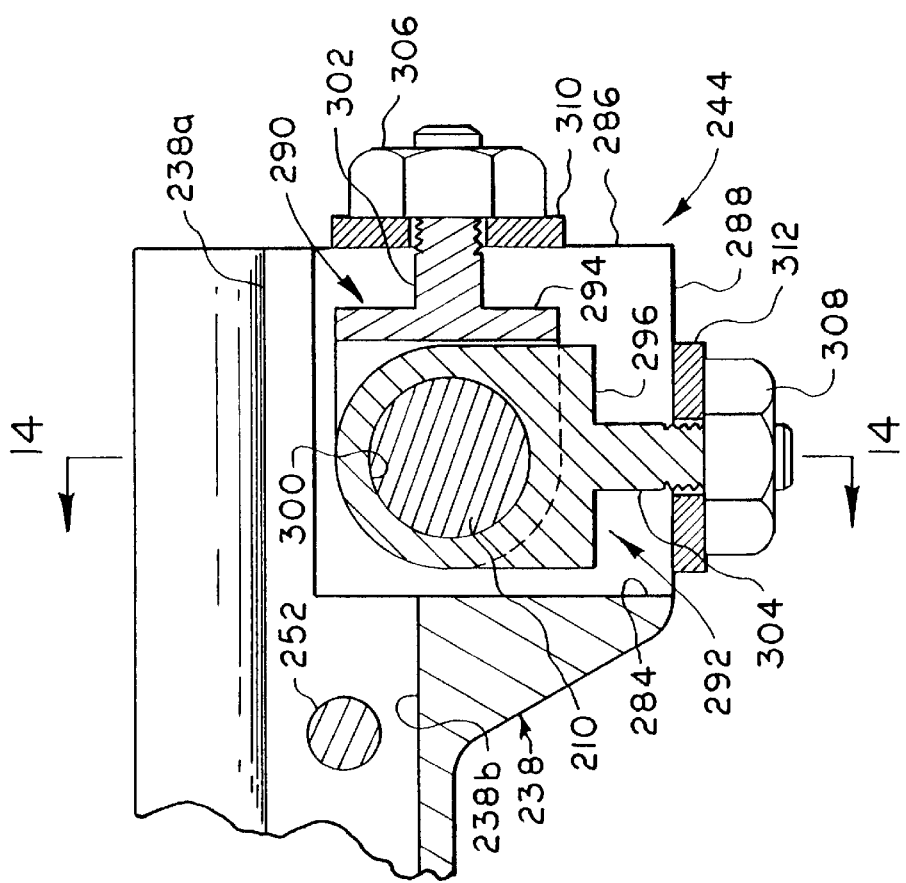
FIG. 13 is a sectional view taken generally along the line 13—13 in FIG. 11.

Adjustable mounting means 244 are best shown in FIGS. 13 and 14 as including first and second clamping means 290 and 292 having first ends 294 and 296 arranged within one of slots 284 and formed with openings 298 and 300 sized to slidably receive one of support elements 210 and threaded second ends 302 and 304 arranged to project outwardly of such slot in directions extending lengthwise and vertically, respectively, relative to runner support 238. Preferably, first end 294 of first clamping means 290 is bifurcated as best shown in FIG. 14. Threaded second ends 302 and 304 threadably engage with clamping nuts 306 and 308 arranged to bear against end and lower surfaces 286 and 288 via clamping plates or washers 310 and 312, respectively.

With the construction shown in FIGS. 11–14, loosening of nuts 306 and 308 permits adjustment of runner supports 238 lengthwise of support elements 210 and 210 thereby to vary the horizontal distance between chain elements 208. Loosening of nuts 306 and 308 also permits adjustment of the runner supports and thus the chain elements vertically relative to the support elements. Preferably, openings 280 are sized to engage with support elements 210 in order to prevent relative horizontal movement there between during adjustment of runner supports 238 lengthwise and/or vertically relative to the support elements. Tightening of nuts 306 and 308 clamps runner supports 238 against movement relative to support elements 210 and 210. Fine adjustments of the distance between the ends of runners 228 and runners 226 and 230 may be made by loosening bolts 252 and 252 and sliding runners 228 lengthwise of grooves 238a into a desired position whereafter these bolts are tightened to clamp the runners in such position.

In the several forms of the invention described above, each conveyor unit or section is supported by a single standard upstanding relative to a single pair of spine-clamping brackets. However, it is contemplated that as the lengths of such conveyor unit or sections increase in a direction aligned with the direction of conveyor travel, it may be necessary to provide two or more standard and associated pairs of spine-clamping brackets for mounting purposes.

What is claimed is:

1. In a conveyor mechanism having infeed and outfeed ends, a pair of parallel conveyor guide means arranged one adjacent each of said infeed and outfeed ends, an endless conveyor element trained over said conveyor guide means, and a tensioning mechanism for adjustable supporting opposite ends of one of said conveyor guide means for effecting movement thereof relative to the other of said conveyor guide means for tensioning said conveyor element in alignment with a direction of travel thereof, the improvement wherein said tensioning mechanism comprises:

a pair of like tensioning devices fixed one to each of said opposite ends, each of said devices including a tensioning guide means, said tensioning guide means defines a cylindrical guide opening and a slot opening radially and lengthwise of said guide opening, a slide member having a first end slidably supported by said tensioning guide means and a second end for mounting one of said opposite ends, said first end of said slide member is a cylindrical pin slidably and rotatably received within said guide opening, adjustment means for defining a reference surface adjustable positioned lengthwise of said direction of travel, an operator rotatably supported on said slide member by a stud slidably received within said slot and cooperating therewith to prevent rotation of said first end within said guide opening, said operator being manually movable between tension release and tensioning positions, said operator being engageable with said reference surface to move said one of said guide members into a conveyor means tensioned position incident to movement of said operator from said tension release position into said tensioning position thereof, and said slide member and said operator are slidably removable from said tensioning guide means in a direction aligned with said direction of travel.

2. In a conveyor mechanism having infeed and outfeed ends, a pair of parallel conveyor guide means arranged one adjacent each of said infeed and outfeed ends, an endless conveyor element trained over said conveyor guide means, and a tensioning mechanism for adjustably supporting opposite ends of one of said conveyor guide means for effecting movement thereof relative to the other of said conveyor guide means for tensioning said conveyor element in alignment with a direction of travel thereof, the improvement wherein said tensioning mechanism comprises:

a pair of like tensioning devices fixed one to each of said opposite ends, each of said devices including a tensioning guide means, a slide member having a first end slidably supported by said guide means and a second end for mounting one of said opposite ends, adjustment means for defining a reference surface adjustable positioned lengthwise of said direction of travel, said adjustment means includes an adjustment opening having one end threaded to receive an adjustment bolt and an opposite end for slidably supporting an adjustment pin for movement in a direction aligned with said direction of travel, said adjustment pin having one end engageable by said adjustment bolt and an opposite end defining said reference surface, and an operator supported by said slide member and manually movable between tension release and tensioning positions, said operator being engageable with said reference surface to move said one of said guide members into a conveyor means tensioned position incident to movement of said operator from said tension release position into said tensioning position thereof, and said slide member and said operator are slidably removable from said guide means in a direction aligned with said direction of travel.

3. The improvement according to claim 2, wherein said adjustment pin is slidably removable from said adjustment opening in a direction aligned with said direction of travel.

4. The improvement according to claim 3, wherein said operator is formed with a cam surface arranged for engagement with said reference surface.

5. The improvement according to claim 4, wherein said tensioning guide means includes a guide block having a bore opening and a slot opening radially and lengthwise of said bore opening, said first end of said slide member is a cylindrical pin slidably and rotatably received within said bore opening, and said operator is rotatably supported on said slide member by a stud slidably received within said slot and cooperating therewith to prevent rotation of said first end within said bore opening.

* * * * *